May 25, 1954  M. HAEBERLEIN  2,679,259
DIFFERENTIAL FLUID PRESSURE RESPONSIVE BELLOWS TYPE VALVE
Filed June 24, 1949

MAX HAEBERLEIN
INVENTOR.

BY
attorney

Patented May 25, 1954

2,679,259

UNITED STATES PATENT OFFICE 2,679,259

DIFFERENTIAL FLUID PRESSURE RESPONSIVE BELLOWS TYPE VALVE

Max Haeberlein, Maplewood, N. J., assignor to Worthington Corporation, Harrison, N. J., a corporation of Delaware Application June 24, 1949, Serial No. 101,016

3 Claims. (Cl. 137—107)

This invention relates generally to valves and in particular to a valve in a fluid system responsive to a pressure differential in the fluid, for regulating reduction of pressure in the system.

In many instances where a system is operated by fluid pressure, it is desirable to have a control which will maintain or delay the reduction of pressure in the system, especially when the pump supplying the pressure fails or the pressure in the system drops for some other reason. This may be accomplished in several ways, one of which for example would be by the use of a spring loaded check valve having an orifice therein. By constructing the check valve to close at a predetermined minimum pressure the fluid will be held from returning except through the orifice which may be sized as desired to allow the pressure to reduce at a given rate.

The present invention embodies novel means for acting positively in response to the pressure still in the system whereby the valve will be held closed and having additional means for regulating the flow of fluid therethrough after the valve is opened when the pressure in the system drops to a predetermined minimum.

Accordingly, it is an object of the present invention to provide a valve having a piston disc structure for operating the valve whereby a force differential acting on the area of the piston disc as compared to that acting on the valve head will maintain the valve closed.

It is another object of the present invention to provide a valve wherein the opening may be regulated in accordance with the time or rate of oil flow which is desired to reduce the fluid pressure in the system.

It is a further object of the present invention to provide a valve which will effectively delay the reduction of pressure by way of controlling the operation of a member operated by a fluid pressure system.

With these and other objects in view, as may appear from the accompanying specification, the invention consists of various features of construction and combination of parts, which will be first described in connection with the accompanying drawings, showing a piston type operated valve responsive to differential pressure in a fluid system of a preferred form embodying the invention, and the features forming the invention will be specifically pointed out in the claims.

Figure 1:
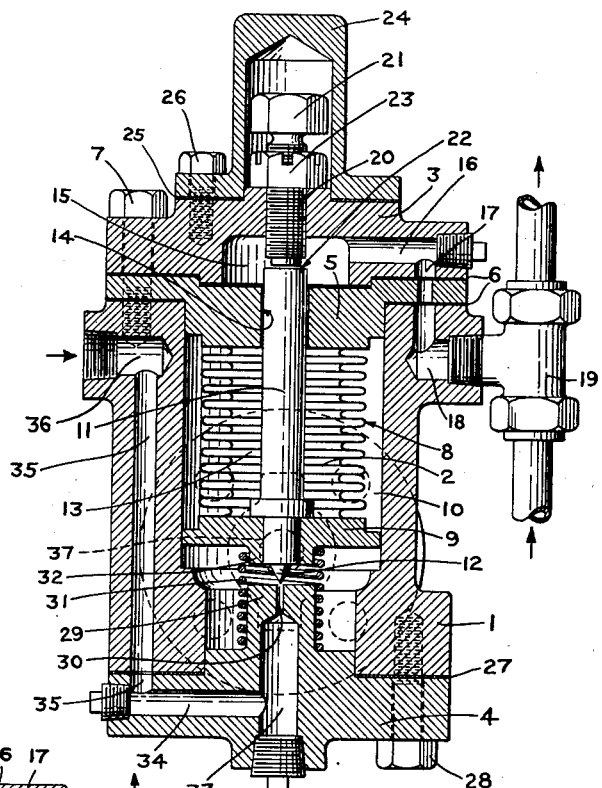
Figure 1 is a cross section showing the structure of the invention.

Referring more particularly to the drawings, Figure 1 shows the invention having a substantially cylindrical housing formed by a body portion 1, a Sylphon bellows portion 2, an upper head 3, and a lower head 4.

The body portion 1 is substantially tube-like to receive the Sylphon bellows portion 2 therein, which engages and closes the upper end thereof by a substantially flat annular support member 5 the upper head 3 fitting over said support 5. Body portion 1, support member 5 and upper head 3 are further provided with gaskets 6 therebetween so that suitable means such as bolts 7 hold them in fluidtight relationship with each other.

The Sylphon bellows portion 2 comprises a Sylphon bellows 8, which is a hollow accordion-like structure of any suitable material held fixedly in fluidtight relationship at one end with the support member 5 from which it freely depends and at the other end to a piston-like disc member 9, which lightly engages the surface of the inner chamber 10 so that the piston-like member 9 may move upwardly or downwardly depending on the pressure exerted on either side of the piston member 9 as is clearly shown in Figure 1. It being further understood that while a Sylphon bellows type of construction is shown other constructions embodying the same idea may be utilized for this purpose.

An elongated valve stem 11, lying in the axis of the body member 1 is fixedly connected to the piston-like disc member 9 and extends downwardly therethrough to form on the outer surface a conical or needle-like valve head 12 and upwardly therefrom passing through the hollow portion 13 of the Sylphon bellows 8 and extends loosely through an opening 14 in the supporting member 5 into a chamber 15 formed by the engagement of the upper head 3 with the support member 5.

The upper head 3 is a substantially annular flat member having a concavity formed in the central portion thereof so that when it engages the support member 5 in fluidtight relationship the area concentric to the axis of the elongated valve member 11 forms the chamber 15 above mentioned. The chamber 15 in turn communicates with a passage 16 in the upper head connected to a transverse passage 17 passing through the upper head 3, the support member 5 and the body member 1 to contact on inlet port 18 threadably receiving a T coupling 19 which may be of any suitable type easily purchasable on the open market.

The upper head 3 is further provided with a threaded opening 20 which lies on the axial line of the valve stem and communicates with the chamber 15. Threaded opening 20 receives a regulating member 21, adjustable therein so that it may be set at any desirable position to abut the upper end 22 of the valve stem 11 to effectively control the degree of upward movement as is hereinafter described. A locking nut 23 mounted on the regulating member 21 can be tightened to fix the position of the regulating member after it is set. And a cover 24 is provided for the regulating member 21 which is connected to the upper head 3 in fluidtight relationship by suitable means such as gasket 25 and bolts 26 in order to prevent oil which may by-pass the regulating member 21 from escaping and being lost from the fluid system.

The lower head 4 is also a substantially annular flat member which closes in fluidtight engagement the lower end of the body portion 1, by any suitable means such as gasket 27 and bolts 28. It is provided with an upwardly extending cylindrical projection 29, which lies concentric to the axis of the valve stem 11. In the axial line of the valve stem 11 the projection 29 is provided with a valve port 30 whereby when piston member 9 is moved in a downward direction valve head 12 will seat and close the valve port 30. Projection 29 is also provided with a valve returning spring 31 concentrically mounted thereon and extending upwardly to contact an annular shoulder 32 on the piston member 9, and acts in cooperation with the pressure acting through the valve port 30 as will be hereinafter described.

The needle valve port 30 is an elongated orifice opening at one end into the inner chamber 10 of the body member 1 and communicating at the other end with a lower chamber 33 in the lower head 4, which is connected in turn to a passage 34. Passage 34 is connected to passage 35 passing from the lower head 4 through the body member 1, to open into a return port 36 connected to a coupling (not shown) which receives the returning fluid from the member being operated by the fluid pressure system.

The inner chamber 10, into which the valve port 30 opens is further provided with an exit port 37 which returns the fluid by gravity flow to a sump or reservoir or point at which it is supplied to the system. Thus, in the fluid system, the invention is connected into the incoming fluid by means of the T coupling 19. Fluid enters the T coupling 19 passing to the inlet port 18 and thence expanding through passages 17 and 16, chamber 15, through the opening 14 down the shaft 11 into the hollow portion 13 of the Sylphon bellows 8 until this space is completely filled which allows the pressure to act uniformly on the Sylphon bellows 8 and accordingly the piston member 9 causing the Sylphon bellows to expand and the piston member to move downwardly seating the valve head 12 to close the valve port 30 and causing the valve spring 31 to be compressed.

The returning fluid similarly enters the return port 36, and passes downwardly through the passages 35 and 34 into lower chamber 33 to act through the valve port 30 against the valve head 12 when the passages and chamber are full.

It is quite obvious that as long as the pressure on the inlet port side of the invention is above a predetermined minimum that the area of the piston member 9, compared to the area of the valve head against which the returning oil will act will be overwhelmingly large causing a differential force in a downward direction. This will continue until the pressure on the incoming side reaches the said predetermined minimum at which time by the combined action of the expansion of the valve returning spring 31 and the pressure acting on the valve head 12 through the valve port 30, the valve head 12 will be unseated and moved in an upward direction allowing the fluid to pass through the valve port 30 into the inner chamber 10 of the body member 1, where it will pass out through the exit port 37 and by gravity flow be led back to the reservoir, or source of supply.

While it is not indicated in the system as it is not considered a part of the invention herein, it has been presumed that proper check valve means would be supplied past the T coupling 19 so that as the pressure reduces in the incoming fluid, the returning fluid will be held under pressure and must pass through the return port 36 as above described.

When the valve head 12 is unseated and moved upwardly, the elongated valve stem 11 will also upwardly, causing the end 22 thereof to move upwardly to contact the regulating member 21. This will prevent the valve head 12 from opening the valve port 30 any more than the desired setting of the regulating member so that the rate of flow of fluid and accordingly the reduction in pressure may be controlled so that the reduction in pressure may be regulated according to a desired timing.

Figure 2:
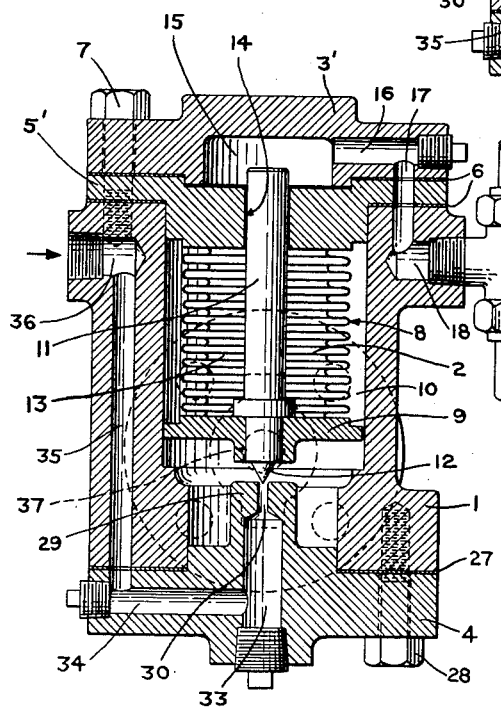
Figure 2 is a cross section of a modified structure of the invention.

Figure 2 illustrates a modified form of the present invention and the construction being substantially identical, corresponding parts already described having been marked with corresponding members.

The modified form differs from the preferred form by the regulation of the opening of the valve port 30.

Flange 5' of the support member 5 as shown in Figure 2 is preferably cut down so that the Sylphon bellows 8 depends from the support member 5 in such a manner that when no pressure difference exists across the piston-like member 9, the valve port 30 will always be open, it being understood that in the event that flange 5' is too thin that it may be built up by the use of shims (not shown) to effect this desired result.

This construction provides a simpler and easier means of manufacturing and requires no adjustment for regulating the reduction in pressure as hereinbefore described.

The operation of the modified form will be identical with that of the preferred form. Therefore, when the pressure on the incoming side drops to the predetermined minimum, the fluid acting through the valve port 30 against the valve head 12 will move it upwardly filling the inner chamber 10 and passing out through the exit port 37.

In view of the absence of the regulating member 21 of the preferred form the fluid flow through the orifice will have to be controlled by the sizing of the orifice. This will depend on the force differential at which the valve head 12 is moved upwardly which may in turn be regulated by proper adjustment of the opening formed by the thickness of the flange 5' in the assembling of the modified form.

The upper head 3' on the modified form is accordingly adapted to this form of regulation by eliminating the threaded opening 20 as shown on the preferred form.

While these forms of the invention are shown and described it will be understood that the invention is not to be limited to the specific construction or arrangement of parts shown but that they may be widely modified within the invention defined by the claims.

What is claimed is:

1. In a valve for fluid pressure systems responsive to differential pressures therein, a body member having an inner chamber, an expansible chamber disposed in said inner chamber, a support member attached to the upper end of said expansible chamber and engaging the upper portion of said body member, an upper head in fluid tight engagement with said support member, an upper chamber formed by said upper head and said support member communicating with said expansible chamber, inlet means to allow flow of pressure fluid to said upper chamber and said expansible chamber, a piston disc member connected to the lower portion of said expansible chamber being constructed and arranged to slide along the surface of said inner chamber and being responsive to pressure changes in the fluid in said chambers, an elongated valve stem in the axial line of said body member and extending upwardly through said expansible chamber into said upper chamber and fixedly connected to said piston member, a valve head connected to said piston disc member forming part of said valve stem and movable with said piston member and extending downwardly into said inner chamber, a lower head in fluidtight engagement with the lower portion of said body member, an upwardly extending projection formed on said lower head, a valve port in said projection in the axial line of said valve head and closed thereby when the piston member moves downwardly, second inlet means communicating with said valve port to allow pressure fluid to act through said valve port to unseat said valve head, exit means in said inner chamber for exhausting fluid passing through said valve port when said valve head is unseated, said valve port being of such size that the area thereof is many times smaller than the area of the piston disc member, said valve head maintaining said valve port closed when the pressure in the expansible chamber exceeds that in said valve port by a predetermined amount and opening said valve port when the differential between said pressures drops below said predetermined amount.

2. In a valve as claimed in claim 1 wherein a regulating means is provided to control the effective area of the valve port when the valve is open to control the rate of flow of pressure fluid therethrough.

3. In a valve as claimed in claim 1 wherein regulating means are provided for controlling the rate of flow through said valve port including a threaded member in the upper head adapted to adjustably abut the end of said upwardly extending valve stem to control the effective size of said port when the valve head is unseated whereby the rate of flow through said valve port is controlled.

References Cited in the file of this patent

UNITED STATES PATENTS

| Number | Name | Date |
|---|---|---|
| 970,284 | Wilkins | Sept. 13, 1910 |
| 1,793,019 | Sawyer | Feb. 17, 1931 |
| 1,838,343 | Widell | Dec. 29, 1931 |
| 1,849,601 | Vinson | Mar. 15, 1932 |
| 2,082,325 | Cross | June 1, 1937 |
| 2,109,459 | Best | Mar. 1, 1938 |
| 2,216,296 | Raymond et al. | Oct. 1, 1940 |